United States Patent Office 3,457,098
Patented July 22, 1969

3,457,098
NONTHROMBOGENIC PLASTIC SURFACES AND PREPARATION THEREOF
Robert I. Leininger and Gerald A. Grode, Columbus, Ohio, assignors to the United States of America as represented by the Secretary of the Department of Health, Education, and Welfare
No Drawing. Filed Aug. 18, 1966, Ser. No. 573,199
Int. Cl. B44d 1/44, 1/22
U.S. Cl. 117—62.1                                    7 Claims

ABSTRACT OF THE DISCLOSURE

Amine curable polymerizable materials containing epoxy groups are amine cured and the amine groups at the resulting polymer surfaces are quaternized, thus providing the polymer surfaces with quaternary ammonium groups at least two valences of which are chemically bound to the base polymer. Heparinization then produces a nonthrombogenic surface chemically bonded to quaternary ammonium groups having at least two valences bonded to the base polymer.

---

This invention relates to nonthrombogenic plastic polymer surfaces and the preparation thereof and aims generally to improve the same.

It is known to physically apply a nonthrombogenic coating to a rigid plastic surface by coating the rigid surface with graphite and then treating the graphite with first zephiran and then heparin. This system, described by Dr. Vincent Gott, inter alia, is not applicable to either flexible or elastomeric materials, the use of which is desirable in connection with artificial lung machines and for other purposes involving circulation of blood in contact with the plastic surface. For these reasons the graphite system has limited utility.

In a copending application, S.N. 570,411 of Leininger and Falb is disclosed a process for chemically bonding heparin to the surfaces of polymers by providing the polymer surfaces with quaternary ammonium groups one valence of which is attached to the base polymer, and then reacting said groups with dilute alcoholic sodium heparinate to produce a nonthrombogenic polymer surface chemically bonded to the polymer.

Objects of the present invention are, severally and collectively, (1) to provide an improved process for chemically bonding heparin to an epoxy or like resin surface and (2) to provide a new type of nonthrombogenic polymer in which heparin is chemically bonded to quaternary ammonium groups having at least two valences chemically bound to the base polymer.

Other objects and advantages of the invention will be apparent from the following description and examples of preferred embodiments thereof.

The invention resides in the new and useful combinations herein disclosed and is more particularly pointed out in the appended claims.

GENERAL DESCRIPTION

In the general aspects of the invention (a) a polymerizable material having epoxy groups, e.g. an epoxy resin, (b) is cured, i.e. subjected to chain growth and/or cross-linking by an amine curing agent, thus providing a cured polymer product containing amine groups which are bonded, either directly or through other groups derived from the amine, to the base polymer, (c) the amine groups at the surface of the cured polymer product are quaternized, and (d) the resulting quaternary amine groups are heparinized. The resulting product is prepared by a simpler procedure than that produced by the Leininger and Falb process, and has various other advantages as will be apparent to those skilled in the art. Where the amine curing agent is a primary amine or a polyamine containing at least one primary amine group or at least two secondary amine groups, the resulting and preferred cured polymer product is structurally different from that produced by the Leininger and Falb process and is characterized by incorporating amine groups at least two valences of which are chemically bound to the base polymer. After quaternization and heparinization of such cured polymer product, the resulting preferred nonthrombogenic polymer also is structurally different from that of the Leininger and Falb process and is a nonthrombogenic polymer in which heparin is chemically bonded to quaternary ammonium groups having at least two valences bonded to the base polymer.

In the practice of the invention any amine curable polymerizable material containing epoxy groups may be employed. Suitable are the commercially available epoxy resins, frequently derived from bisphenol A and epichlorohydrin. Before curing, these materials are viscous liquids or clear brilliant solids melting up to about 155° C. with molecular weights in the range of about 400 to 8000. Their compositions vary depending on the ratio of the reactants and conditions under which they are produced. Curing involves further reaction of the epoxy and hydroxy groups to cause chain growth and cross-linking. Dow Epoxy Resin 332 and Bakelite Epoxy ERL–0500 are representative commercially available epoxy resins.

Various reagents are known for curing epoxy resins, but for the purposes of the present invention amine curing agents are employed. These amine curing agents may comprise primary, secondary, and/or tertiary amine groups. Polyamines, e.g. hexamethylene diamine, diethylene triamine, 1,3-bis(pyridyl)-propane, are preferred.

While a lot is unknown as to the nature of the curing mechanism, where the amine curing agent includes an amine group containing an active hydrogen, the amine group becomes chemically bonded, either directly or through other groups derived from the amine, to the base polymer. Where the amine curing agent includes at least one primary amine group or at least two secondary amine groups, the cured polymer product incorporates amine groups at least two valences of which are bonded, either directly or through other groups derived from the amine, to the base polymer. Where the amine curing agent is a tertiary amine or contains a tertiary amine group, the curing reaction may be somewhat catalytic in nature, rather than additive, since no active hydrogen is present in the tertiary amine group. However, whatever the exact curing mechanism of the tertiary amine group, even with an amine curing agent containing only the tertiary amine group and no primary and secondary amine groups, the resulting cured polymer product incorporates amine groups which can be quaternized and thereafter heparinized. Such incorporated amine groups are bound, incorporated or otherwise tightly held in the cured polymer product so as not to be readily solvent extractable or otherwise readily separable from the cured polymer product.

In the curing of the epoxy resins with these amine curing agents various proportions may be employed, molar ratios of amine curing agent to epoxy resin of 1:3 to 3:1 being preferred, 1:2 to 2:1 being more preferred, and equimolar to 2:1 being most preferred. The amount of amine curing agent employed is significantly greater than a sometimes conventionally used catalytic amount of about up to 5 percent of the epoxy resin being cured. Usage of such catalytic amount of amine curing agent in the present process would provide, after curing, quaternizing and heparinizing, a product of little to no practical utility as its nonthrombogenic properties would be extremely limited. The cures may be effected at room temperature (25° C.) or with the aid of heating.

The quaternizing of the surface amine groups of the amine cured epoxy resins is effected by reaction thereof with a quaternizing reagent, e.g. methyliodide or benzyl chloride, to form the quaternary ammonium groups chemically bonded to the surfaces of the polymer. It has been disclosed by this invention that the multiple bonding of the amine groups to the base polymer does not prevent such groups from being quaternized and thereafter heparinized.

The heparinizing step may be practiced in any suitable way, and is very readily practiced simply by immersing the quaternized amine cured epoxy resin surface in aqueous or alcoholic sodium heparinate, followed by removal from the surface of loosely bound heparin which has not complexed with the chemically bound ammonium groups, as by numerous distilled water rinses.

The quaternization and the heparinization are readily followed by measurement of zeta potential of the treated surface in contact with lactated Ringer's solution. In general, the epoxy resins have a negative zeta potential while the quaternized surfaces give a positive zeta potential. The formation of the heparinized surfaces changes the zeta potential to the negative side and the permanence of the heparinization can be followed by changes of zeta potential as the surface is aged in contact with Ringer's solution.

Plastic articles of the invention, as compared to the thrombogenic non-heparinized polymers, are substantially nonthrombogenic; recalcified human blood in contact with the heparinized surfaces remaining unclotted for up to twenty hours or more, as against only a few minutes for the non-heparinized plastics.

The invention will be most readily understood from a consideration of the following specific examples which, however, are to be considered as illustrative and not restrictive of the invention, the scope of which is more particularly pointed out in the appended claims.

EXAMPLES

Example 1

A commercial epoxy resin, Dow Epoxy Resin 332 having the structure:

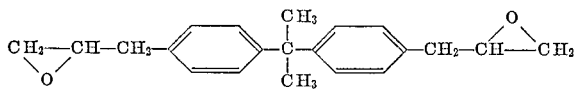

was used in this example. Amounts of 15.4 grams of the Resin 332 and 9.9 grams of the diamine, 1,3-bis(pyridyl)propane—being equimolar proportions in this instance—were mixed by mechanical agitation on a steam bath for several minutes until homogeneity was attained. Glass test tubes were coated with the resulting mixture, and were placed in an oven for 2 hours at 250° F. to cure the coatings. Some of the test tubes thus coated with cured epoxy resin were then treated by immersion in 10% solution of methyl iodide for 30 minutes at reflux temperature and were then washed with water and placed in a dilute solution of sodium heparinate (½% sodium heparinate in water) for three hours at room temperature, after which they were washed exhaustively with distilled water to remove unbound heparin therefrom. The test tube coatings so surface treated were found to have been rendered substantially nonthrombogenic; recalcified human blood in contact therewith remained unclotted for over 20 hours, whereas those not so surface treated clotted it in about 12 minutes.

The times, temperatures and concentrations of reactants employed in this example are non-critical and may be varied substantially, and in lieu of the particular resins and amines herein, other epoxy resins and other amine curing agents therefor may be employed.

Example 2

Example 1 was repeated, replacing the Dow Epoxy Resin 332 with Bakelite Epoxy ERL–0500 having the structure:

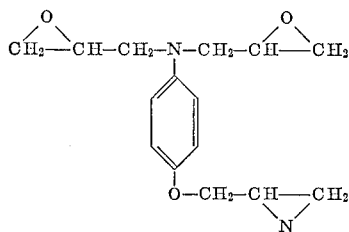

Substantially the same results were obtained as in Example 1.

Example 3

Example 1 was repeated, but with two moles of the amine to one mole of the epoxy resin. Again the coatings subjected to the quaternizing and heparinizing treatment were found to be substantially nonthrombogenic.

Example 4

Example 1 was repeated using one mole hexamethylene diamine in lieu of the mole of 1,3-bis(pyridyl)propane as the amine curing agent, and substantially similar results were obtained.

Example 5

Example 1 was repeated using one mole of diethylene triamine in lieu of the 1,3-bis(pyridyl)propane as the curing agent. Again the cured epoxy resin coatings were found to have been rendered substantially nonthrombogenic by the quaternizing and heparinizing treatment.

Example 6

Example 1 was repeated using Versamid 125, as the amine curing agent, in lieu of 1,3-bis(pyridyl)propane with employment of equal amounts by weight of this curing agent and Resin 332. Versamid 125 is understood to be a polyamide resin containing polar amino, carboxyl and amido groups and having an amine value of 290 to 320 and a viscosity at 40° C. of between 80 to 120 poises. Again the cured epoxy resin coatings were found to have been rendered substantially nonthrombogenic by the quaternizing and heparinizing treatment.

Partial disclosures of the present invention have been published, with the inventors' consent, within the last year preceding the filing of this application and such publications, which include but are not limited to Chemical and Engineering News, vol. 44, No. 15, p. 37, Apr. 11, 1966, and vol. 44, No. 16, p. 56, Apr. 18, 1966, are incorporated herein by reference and may be referred to for discussion of various aspects and advantages of the invention.

We claim:
1. A plastic polymer surface rendered substantially nonthrombogenic by heparin chemically combined with quaternary ammonium groups which are chemically bonded to the plastic surface, particularly characterized in that at least two valences of said quaternary ammonium groups are chemically bound to the base polymer which comprises an amine cured product of an amine curable polymerizable material having epoxy groups.

2. A plastic polymer surface as defined in claim 1, wherein the plastic polymer consists essentially of epoxy resin cured with amine curing agent and wherein the amine groups of the curing agent at the epoxy resin surface have been quaternized and heparinized.

3. The process of rendering substantially nonthrombogenic a surface of an epoxy resin article, which comprises the steps of (a) curing the epoxy resin with amine curing agent to form the article of a cured polymer product which contains amine groups, (b) quaternizing the said amine groups present at the surface of the cured epoxy resin article, and (c) heparinizing the resulting quaternary ammonium groups.

4. A process as defined in claim 3, wherein the molar ratio of amine curing agent to epoxy resin is in the range of 1:3 to 3:1 by weight.

5. A process as defined in claim 3, wherein the molar ratio of amine curing agent to epoxy resin is in the range of 1:2 to 2:1 by weight.

6. A process as defined in claim 3, wherein the molar ratio of amine curing agent to epoxy resin is in the range of 1:1 to 2:1 by weight.

7. A process as defined in claim 3, wherein the amine curing agent contains at least one primary amine group or at least two secondary amine groups so, upon curing, to form the article of a cured polymer product which contains amine groups having at least two valences chemically bound to the epoxy resin and so, upon heparinizing, to heparinize the resulting quaternary ammonium groups which have at least two of their valences so bonded to the epoxy resin.

References Cited

Scott, J. E.: "The Reaction of Long-Chain Quaternary Ammonium Salts with Acidic Polysaccharides," Chemistry and Industry, No. 7, Feb. 12, 1955, pp. 168–169.

Gott et al.: "Techniques of Applying a Graphite-Benzalkonium-Heparin Coating to Various Plastics and Metals," Transactions: American Society for Artificial Internal Organs, vol. X, June 25, 1964, pp. 233–17.

Falbetal: "Development of Blood-Compatible Polymeric Materials," June 29, 1965, Battelle Memorial Inst., pp. 1–19, published Mar. 3, 1966.

WILLIAM D. MARTIN, Primary Examiner

D. COHEN, Assistant Examiner

U.S. Cl. X.R.

117—118, 138.8; 424—183.